United States Patent [19]

Yamamoto

[11] Patent Number: 4,906,426

[45] Date of Patent: Mar. 6, 1990

[54] PROCESS FOR PRODUCING AN ALUMINA-SILICA-CHROMIA TERNARY FIBER

[76] Inventor: Masafumi Yamamoto, 1-11, Daida-cho, Toyokawa-shi, Aichi-ken, Japan

[21] Appl. No.: 307,687

[22] Filed: Feb. 8, 1989

Related U.S. Application Data

[63] Continuation of Ser. No. 782,176, Oct. 1, 1985, abandoned, which is a continuation of Ser. No. 581,472, Feb. 17, 1984, abandoned.

[51] Int. Cl.$^4$ ............................................. D01F 9/08
[52] U.S. Cl. .............................. 264/211.11; 264/12; 264/332; 501/95; 501/128; 501/132
[58] Field of Search .................. 264/211.11, 211.14, 264/332, 12; 501/95, 127, 128, 132

[56] References Cited

U.S. PATENT DOCUMENTS

| | | | |
|---|---|---|---|
| 3,669,889 | 6/1972 | Juzvuk | 501/132 |
| 4,103,063 | 7/1978 | Hulse | 501/132 |
| 4,125,406 | 11/1978 | Sowman | 501/132 |
| 4,126,654 | 11/1978 | Montgomery | 501/127 |
| 4,251,279 | 2/1981 | Ekdahl | 501/132 |
| 4,294,618 | 10/1981 | Anthonis | 501/132 |

OTHER PUBLICATIONS

Glasstone, Samuel, "Textbook of Physical Chemistry"; 2nd Ed., 10th Printing, 12/54, D. Van Nostrand Co., Inc., pp. 349, 379, 380, 649–651, 761–771.

*Primary Examiner*—Hubert C. Lorin
*Attorney, Agent, or Firm*—A. W. Breiner

[57] ABSTRACT

A process for producing an improved quality alumina-silica-chromia fiber from a mixture of an alumina powder, a silica powder and a powder of a solid solution of chromia in alumina, providing a flowing melt, and forming fibers.

4 Claims, No Drawings

PROCESS FOR PRODUCING AN ALUMINA-SILICA-CHROMIA TERNARY FIBER

This is a continuation of application Ser. No. 06/782,176 filed Oct. 1, 1985, now abandoned; which in turn is a continuation of application Ser. No. 06/581,472 filed Feb. 17, 1984, now abandoned.

BACKGROUND OF THE INVENTION

The present invention relates to a process for producing an alumina-silica-chromia ternary fiber.

There is known an alumina-silica-chromia based refractory fiber which is produced by melting a powder blend comprising 35-65% by weight of $Al_2O_3$, 30-60% by weight of $SiO_2$, 1.5-6% by weight of $Cr_2O_3$ and small amounts of other additives or impurities in an electric furnace and thereafter fabrication of fibers by either the blowing method or the spinning method. This fiber, when compared with alumina-silica based fibers containing no chromia, is said to have less deterioration at high temperatures because of the decrease in the amount of growth of the mullite crystals above 950° C. The known method of preparation of an alumina-silica-chromia fiber is to blend high-grade silica sand, alumina powder and chromia powder. However, when blended in this manner, the chromia evaporates upon melting and thus it is difficult to obtain a product of the desired composition. At the same time air pollution is caused by the chromia evaporation. The fluctuation in desired output composition becomes greater when removing the molten product as thin streams during the fiber fabrication step.

It is believed that the fluctuation in output composition is created during electrical melting. The viscosity and the electric resistance are lowered with the increase of the chromia content, hence the viscosity and the electric resistance greatly fluctuate depending on the local chromia content within the crucible. Since the melting points of the respective powder starting materials are different, i.e. 2050° C. for alumina, 1723° C. for silica and 2300° C. for chromia, there is a time lag in melting and, as a result, a less viscous portion of the melt which has a higher chromia content is locally generated before the composition becomes uniform. Thus this portion flows out of the crucible in a considerably large amount prior to the flow of the other components. At a somewhat later time, the more highly viscous portion of the melt, having a lower content of chromia, starts to flow gradually. Since the flow output fluctuates greatly within a short time, it is very difficult to control the furnace temperatures in order to suppress such a fluctuation, and therefore the quality and composition obtained vary from product to product.

One approach to solve the above described problems has been to mix and mold all of the respective starting materials, then calcine to homogenize the mix and finally grind the cooled homogenized composition for use as the starting material. However, this process is not economically advantageous because of the heat energy required for calcining all the starting materials beforehand and the process costs for mixing, kneading, molding, drying etc. Alternatively, it is also contemplated to previously mix and calcine chromia and silica and use the mixtures as the starting material, but experimental results reveal that as in the case of merely blending the silica sand, alumina and chromia powders, the composition of output of the molten product greatly fluctuated.

It has been discovered in the present invention that by employing a solid solution comprising 10-60% by weight of chromia in alumina as a starting material, the fluctuation in flow output can be greatly reduced as compared with the above-described processes.

Accordingly, the object of the present invention is to provide a process for producing an alumina-silica-chromia ternary fiber of uniform composition.

SUMMARY OF THE INVENTION

A process for producing an alumina-silica-chromia fiber comprises the steps of blending an alumina powder, a silica powder and a powder of a solid solution comprising 10-60% by weight of chromia in alumina, melting the blend to form thin molten streams of the blend and fabricating molten material into fiber form.

DETAILED DESCRIPTION OF THE PREFERRED EMBODIMENTS OF THE INVENTION

In accordance with the present invention an improved process produces an alumina-silica-chromia fiber which exhibits a significant improvement in high temperature shrinkage and corrosion resistance due to more uniform physical properties, including fiber thickness and fiber length.

A ternary fiber comprised of alumina-silica-chromia is produced by forming a melt from alumina powder, silica sand and an alumina-chromia solid solution powder. This mix is heated in an electric furnace to a temperature in excess of the melting temperature of chromia i.e. 2300° C. The melt is allowed to flow through a tapping nozzle and the thin stream of melt is subjected to a jet stream of air which fiberizes the melt.

The solid solution of alumina and chromia may be obtained by adequately mixing a chromia powder in alumina and calcining the mixture at 1700°-1800° C. In the present invention, the content of chromia in the alumina-chromia solid solution must be at least 10% by weight, otherwise the amount of the solid solution needed in order to obtain a fiber having the desired chromia content is increased and therefore economically disadvantageous. If the chromia content is greater than 60% by weight, the upper limit, the dilution effect due to the alumina cannot be obtained. The chromia content in the alumina-chromia solid solution is preferably 30-50% by weight. Although the particle size of the alumina-chromia solid solution starting material is not particularly restricted, it may preferably be of such particle size as to prevent physical separation from the other starting materials.

The following Examples are given to illustrate the present invention. Example 1 is illustrative of the method according to the present invention and Examples II and III are indicative of prior art methods of making alumina-silica-chromia fibers.

EXAMPLE 1

In accordance with the present invention 38 parts by weight of an alumina powder comprising 99.8% by weight of $Al_2O_3$, 56 parts by weight of silica sand comprising 99.8% by weight of $SiO_2$ and 6 parts by weight of an alumina-chromia solid solution powder comprising 50% by weight of $Al_2O_3$ and 50% by weight of $Cr_2O_3$ were blended and mixed. This starting material mixture was then charged into an electric furnace used in producing ceramic fibers. The melt flowed through a tapping nozzle as then streams and was thereafter fabricated into fiber form by a blowing method.

COMPARATIVE EXAMPLE II 41 parts by weight of the alumina, 56 parts by weight of the silica sand, both being the same as those used in Example I, and 3 parts by weight of a chromia powder comprising 99.3% by weight of $Cr_2O_3$ were mixed, and ternary fibers were fabricated as in Example 1.

COMPARATIVE EXAMPLE III 41 parts by weight of the alumina, 53 parts by weight of the silica sand, both being the same as those used in Example I, and 6 parts by weight of a silica-chromia calcined product comprising 50% by weight of $SiO_2$ and 50% by weight of $Cr_2O_3$ were mixed, and ternary fibers were fabricated as in Example I.

TEST METHOD AND RESULTS

The flow output from the tapping nozzle in each above case was measured 13 times at 30 minute intervals. At each of the 13 measurement periods, three measurements, (i.e. the first for 18 seconds, the second for 18 seconds one minute later and the third for 18 seconds one minute later) were made. The results are given below. The numerical values are those relative to the average taken as 100.

| 1 | 2 | 3 | 4 | 5 | 6 | 7 | 8 | 9 | 10 | 11 | 12 | 13 |
|---|---|---|---|---|---|---|---|---|----|----|----|----|
| 60 | 96 | 96 | 114 | 87 | 119 | 90 | 125 | 93 | 87 | 103 | 100 | 119 |
| 80 | 103 | 96 | 125 | 75 | 112 | 100 | 119 | 91 | 80 | 98 | 107 | 125 |
| 73 | 89 | 103 | 112 | 80 | 114 | 91 | 128 | 89 | 73 | 101 | 105 | 121 |

EXAMPLE 1

COMPARATIVE EXAMPLE II

| 1 | 2 | 3 | 4 | 5 | 6 | 7 | 8 | 9 | 10 | 11 | 12 | 13 |
|---|---|---|---|---|---|---|---|---|----|----|----|----|
| 60 | 152 | 128 | 203 | 188 | 90 | 194 | 15 | 212 | 149 | 36 | 182 | 125 |
| 45 | 39 | 95 | 36 | 87 | 104 | 84 | 90 | 36 | 63 | 18 | 84 | 39 |
| 90 | 78 | 78 | 15 | 152 | 128 | 125 | 60 | 128 | 107 | 116 | 98 | 167 |

COMPARATIVE EXAMPLE III

| 1 | 2 | 3 | 4 | 5 | 6 | 7 | 8 | 9 | 10 | 11 | 12 | 13 |
|---|---|---|---|---|---|---|---|---|----|----|----|----|
| 107 | 155 | 119 | 18 | 253 | 54 | 113 | 256 | 42 | 98 | 205 | 110 | 63 |
| 63 | 86 | 15 | 113 | 131 | 158 | 214 | 110 | 77 | 113 | 63 | 48 | 12 |
| 95 | 98 | 95 | 36 | 185 | 77 | 83 | 146 | 68 | 21 | 125 | 18 | 57 |

The standard deviation is 16.4 in Example I, 54.5 in Example II and 61.9 in Example III. It is evident that by the present invention, the flow output is more uniform than in comparative Examples II or III, and thus the thickness, length etc. of the fiber may be more uniform, leading to the enhancement of the quality of the fibers.

For reference the results of the chemical analysis of the fiber compositions are as follows, and it is shown that a fiber of the desired composition may be obtained easily.

| Fiber | Component(% by weight) | | |
|---|---|---|---|
|  | $Al_2O_3$ | $SiO_2$ | $Cr_2O_3$ |
| Example I | 40.8 | 55.9 | 3.0 |
| Comparative Example II | 41.0 | 56.1 | 2.5 |
| Comparative Example III | 41.4 | 55.5 | 2.7 |

The embodiments of the invention in which an exclusive property or privilege is claimed is defined as follows:

1. A process for producing alumina-silica-chromia ceramic fibers comprising
providing a solid solution of from about 10 to 60% by weight chromia and 90 to 40% by weight alumina,
blending the said solid solution with additional alumina and silica in a predetermined ratio to provide a mixture of alumina, silica and chromia with all of the chromia in said mixture being provided from said solid solution,
providing said mixture as a flowing melt, and
forming fibers from said flowing melt, thereby providing fibers having a substantially uniform alumina, silica and chromia composition.

2. The process according to claim 1 wherein the mix comprises blending by weight 38 parts of high purity alumina, 56 parts of high purity silica, and 6 parts of a solid solution of 50% alumina and 50% of chromia.

3. The process according to claim 1 wherein said mixture is made by blending an alumina powder, a silica powder and a solid solution of 10 to 60% by weight of chromia in alumina.

4. The process according to claim 1 wherein said mixture is heated to a temperature above 2300° C. to form a melt.

* * * * *